United States Patent
Bookbinder et al.

(10) Patent No.: US 8,542,969 B2
(45) Date of Patent: Sep. 24, 2013

(54) LOW BEND LOSS OPTICAL FIBER

(75) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 205 days.

(21) Appl. No.: 13/030,308

(22) Filed: Feb. 18, 2011

(65) Prior Publication Data

US 2011/0211796 A1  Sep. 1, 2011

Related U.S. Application Data

(60) Provisional application No. 61/308,625, filed on Feb. 26, 2010.

(51) Int. Cl.
*G02B 6/02* (2006.01)

(52) U.S. Cl.
USPC .......................................................... 385/126

(58) Field of Classification Search
USPC .......................................................... 385/126
See application file for complete search history.

(56) References Cited

U.S. PATENT DOCUMENTS

| 7,787,731 B2 * | 8/2010 | Bookbinder et al. ......... 385/124 |
| 7,929,818 B1 * | 4/2011 | Bickham et al. ............... 385/124 |
| 2008/0124028 A1 * | 5/2008 | Bickham et al. ................. 385/55 |
| 2010/0027951 A1 * | 2/2010 | Bookbinder et al. ......... 385/127 |
| 2010/0215329 A1 * | 8/2010 | Bickham et al. ............... 385/123 |
| 2011/0305035 A1 * | 12/2011 | Bickham et al. ............... 362/558 |
| 2012/0262706 A1 * | 10/2012 | Sugimoto et al. ............ 356/73.1 |

FOREIGN PATENT DOCUMENTS

| WO | 9957070 | 11/1999 |
| WO | 0064825 | 11/2000 |
| WO | 02051761 | 7/2002 |
| WO | 2005010589 | 2/2005 |
| WO | 2008157341 | 12/2008 |

* cited by examiner

*Primary Examiner* — Charlie Peng
(74) *Attorney, Agent, or Firm* — Robert L. Carlson

(57) ABSTRACT

An optical fiber having both low macrobend loss and low microbend loss. The fiber has a first inner cladding region having an outer radius $r_2 > 8$ microns and refractive index $\Delta_2$ and a second outer cladding region surrounding the inner cladding region having refractive index $\Delta_3$, wherein $\Delta_1 > \Delta_3 > \Delta_2$. The difference between $\Delta_3$ and $\Delta_2$ is greater than 0.01. The fiber exhibits a 22 m cable cutoff less than or equal to 1260 nm, and $r_1/r_2$ is greater or equal to 0.25.

17 Claims, 1 Drawing Sheet

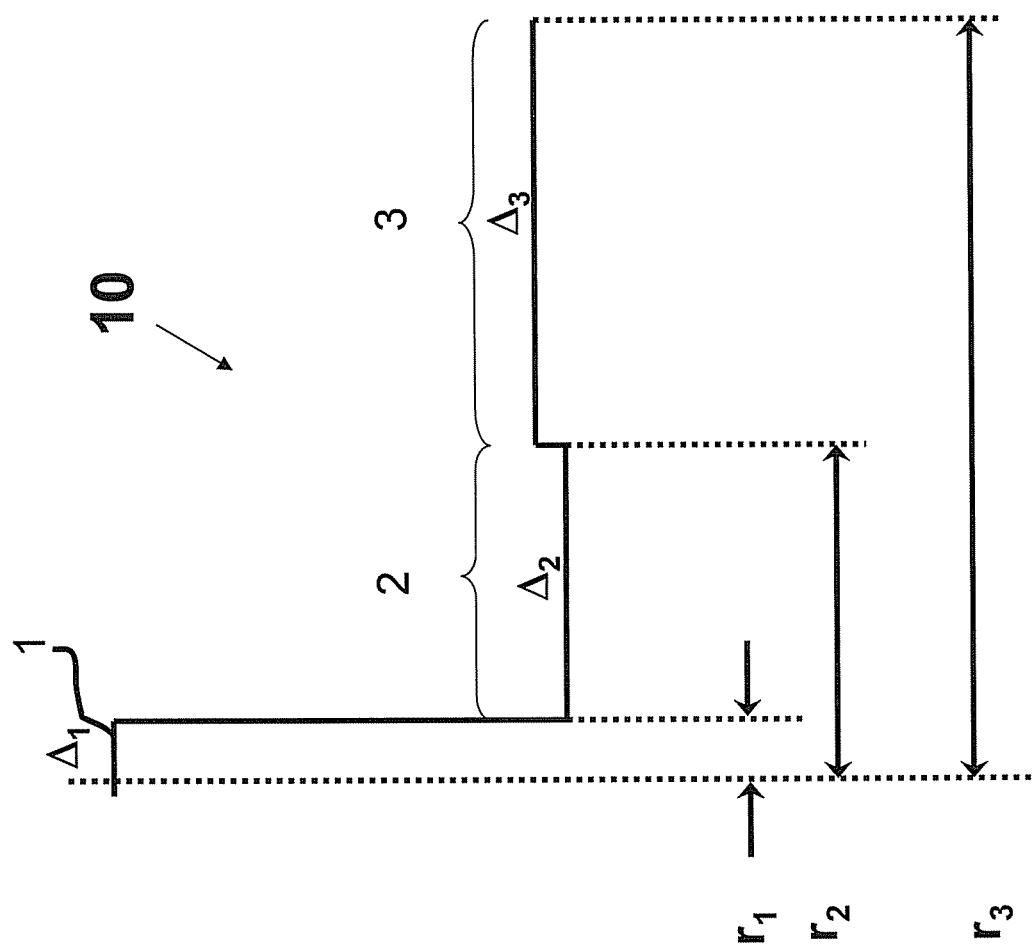

LOW BEND LOSS OPTICAL FIBER

CROSS-REFERENCE TO RELATED APPLICATIONS

This application claims the benefit of priority under 35 U.S.C. §119(e) of U.S. Provisional Application Ser. No. 61/308,625 filed on Feb. 26, 2010.

FIELD

The present invention relates to optical fibers having low bend losses.

TECHNICAL BACKGROUND

There is a need for low bend loss optical fibers, particularly for optical fibers utilized in so-called "access" and fiber to the premises (FTTx) optical networks. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables. It has been difficult in some optical fiber designs to achieve both low bend loss and low cable cutoff wavelength at the same time.

SUMMARY

Disclosed herein are optical waveguide fibers comprising a germania doped central core region having outer radius $r_1$ and refractive index $\Delta_1$, a cladding region comprising a first inner cladding region having an outer radius $r_2 > 8$ microns and refractive index $\Delta_2$, and a second outer cladding region having refractive index $\Delta_3$, wherein $\Delta_1 > \Delta_3 > \Delta_2$, and the difference between $\Delta_3$ and $\Delta_2$ is greater than 0.01 said fiber exhibits a 22 m cable cutoff less than or equal to 1260 nm and $r_1/r_2$ is greater than or equal to 0.25, more preferably greater than 0.3.

Also disclosed herein are single mode optical fibers comprising a central core region having outer radius $r_1$ and refractive index $\Delta_1$, a cladding region comprising fluorine doped silica, said cladding comprising a first inner cladding region having outer radius $r_2$ and refractive index $\Delta_2$ and a second outer cladding region having refractive index $\Delta_3$, wherein $r_1/r_2$ is greater than or equal to 0.25. The fibers disclosed herein may be both ITU G.657A and G.657B compliant.

Preferably, the 20 mm diameter bend loss at 1550 nm is not more than 0.75 dB/turn. Preferably, the 30 mm diameter bend loss at 1550 nm is not more than 0.025 dB/turn. In some preferred embodiments, the 20 mm diameter bend loss at 1550 nm is not more than 0.3 dB/turn. In other preferred embodiments, the 20 mm diameter bend loss at 1550 nm is not more than 0.1 dB/turn. In some preferred embodiments, the 30 mm diameter bend loss at 1550 nm is not more than 0.003 dB/turn.

In some embodiments, the 15 mm diameter bend loss at 1550 nm is not more than 1 dB/turn. In some preferred embodiments, the 15 mm diameter bend loss at 1550 nm is not more than 0.5 dB/turn.

In some embodiments, the refractive index profile further provides a zero dispersion wavelength of less than 1325 nm. In preferred embodiments, the refractive index profile further provides a zero dispersion wavelength of between 1300 and 1325 nm.

Preferably, the refractive index profile further provides a cabled cutoff of less than or equal to 1260 nm.

In some preferred embodiments, the refractive index profile further provides a mode field diameter at 1310 nm between 8.2 and 9.5 µm. In other preferred embodiments, the refractive index profile further provides a mode field diameter at 1310 nm of between 8.2 and 9.0 µm.

As used herein, MAC number means mode field diameter at 1310 (um) divided by 22 m cable cutoff wavelength (um). In some preferred embodiments, the refractive index profile further provides a MAC number between 6.6 and 7.5. In other preferred embodiments, the refractive index profile further provides a MAC number of not more than 7.3.

Preferably, the optical fiber has a maximum hydrogen induced attenuation change of less than 0.03 dB/km at 1383 nm after being subjected to 0.01 atm partial pressure hydrogen for at least 144 hours. Preferably, the optical fiber has an optical attenuation at 1383 nm which is not more than 0.10 dB/km above an optical attenuation at 1310 nm, and even more preferably the optical attenuation at 1383 nm is less than the optical attenuation at 1310 nm.

Reference will now be made in detail to the present preferred embodiments, examples of which are illustrated in the accompanying drawings.

BRIEF DESCRIPTION OF THE DRAWINGS

FIG. 1 shows a refractive index profile corresponding to a preferred embodiment of an optical waveguide fiber as disclosed herein.

DETAILED DESCRIPTION OF THE PREFERRED EMBODIMENT

Additional features and advantages will be set forth in the detailed description which follows and will be apparent to those skilled in the art from the description or recognized by practicing as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, and as used herein $n_c$ is the average refractive index of undoped silica. As used herein, the relative refractive index is represented by $\Delta$ and its values are given in units of "%", unless otherwise specified. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$, $Al_2O_3$, $P_2O_5$, $TiO_2$, Cl, Br. Examples of down dopants include fluorine and boron.

"Chromatic dispersion", herein referred to as "dispersion" unless otherwise noted, of a waveguide fiber is the sum of the material dispersion, the waveguide dispersion, and the intermodal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff}=2\pi(\int f^2 r dr)^2/(\int f^4 r dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a relative refractive index profile, expressed in terms of Δ(r) which is in units of "%", where r is radius, which follows the equation, $$\Delta(r)=\Delta(r_o)(1-[|r-r_o|/(r_1-r_o)]^\alpha,$$

where $r_o$ is the point at which Δ(r) is maximum, $r_1$ is the point at which Δ(r) % is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2=(2\int f^2 \, r \, dr/\int [df/dr]^2 \, r \, dr)$, the integral limits being 0 to ∞.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards.

Unless otherwise noted herein, optical properties (such as dispersion, dispersion slope, etc.) are reported for the LP01 mode.

Optical fibers disclosed herein are capable of exhibiting an effective area at 1550 nm which is greater than about 55 μm², preferably between 55 and 90 μm², even more preferably between about 65 and 85 μm². In some preferred embodiments, the optical mode effective area at 1550 nm is between about 65 and 75 μm².

One exemplary fiber 10 is shown in FIG. 1, includes a central glass core region 1 comprising maximum refractive index delta percent $\Delta_1$. A first depressed inner cladding region 2 surrounds central core region 1, the first inner cladding region 2 comprising refractive index delta percent $\Delta_2$. Outer cladding region 3 surrounds first inner cladding region 2 and comprises $\Delta_3$. In preferred embodiments, $\Delta_1 > \Delta_3 > \Delta_2$. In the embodiment illustrated in FIG. 1, regions 1, 2, 3 are immediately adjacent one another. However, this is not required, and alternatively additional core or cladding regions may be employed. For example, an outer cladding region (not shown) may be employed which surrounds annular region 3 and comprises a lower refractive index delta percent $\Delta_4$ than annular region 3.

Central core region 1 comprises an outer radius $r_1$ which is defined as where a tangent line drawn through maximum slope of the refractive index of central core region 1 crosses the zero delta line. Core region 1 preferably exhibits a refractive index delta percent, $\Delta_1$, between about 0.3 to 0.5, more preferably between about 0.32 to 0.48. In some embodiments, $\Delta_1$ is preferably between 0.36 to 0.46. Core radius $r_1$ is preferably between 3 and 6 microns, more preferably between about 3.5 to 5.0 microns. Central core region 1 may comprise a single segment, step index profile. Central core region 1 preferably comprises an alpha between about 10-100, and in some cases alpha may be between 15 and 40.

In the embodiment illustrated in FIG. 1, inner cladding region 2 surrounds central core region 1 and comprises inner radius $r_1$ and outer radius $r_2$, $r_1$ being defined as above and $r_2$ being defined as where the refractive index profile curve crosses the zero delta line. In some cases the refractive index in region 2 is essentially flat. In other cases there can be a gradient index profile. Still in other cases there can be fluctuations as a result of small profile design or process variations. In some embodiments, the inner cladding region 2 comprises silica which is substantially undoped with either fluorine or germania, i.e., such that the region is essentially free of fluorine and germania. Inner cladding region 2 comprises refractive index delta percent $\Delta_2$ which is calculated using:

$$\Delta_2 = \int_{r1}^{r2} \Delta(r) dr / (r_2 - r_1)$$

The inner cladding region 2 preferably exhibits a width between about 3 to 13, more preferably 4 to 12 microns, even more preferably between about 7 to 9 microns. The ratio of the core radius $r_1$ over the inner cladding region 2 radius $r_2$ is preferably greater than 0.25, more preferably between about 0.3 to 0.55.

Outer cladding region 3 surrounds the depressed annular region 3 and comprises refractive index delta percent $\Delta_3$ which is higher than the index $\Delta_2$ of inner cladding region 2, thereby forming a region which is an "updoped" outer cladding region 3 with respect to inner cladding region 2, e.g. by adding an amount of dopant (such as germania or chlorine) sufficient to increase the refractive index of the outer cladding region. Note, however, that it is not critical that region 3 be updoped in the sense that an index increasing dopant must be included in region 3. Indeed, the same sort of raised index effect in outer cladding region 3 may be achieved by down-doping inner cladding region 2 with respect to outer cladding region 3. Outer cladding region 3 comprises a higher refractive index than inner cladding region 2, and preferably comprises refractive index delta percent $\Delta_3$ which is greater than 0.01, and may be greater than 0.02 or 0.03. percent delta. Preferably, the higher index portion (compared to inner cladding region 2) of outer cladding region 3 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted. In many embodiments, this is achieved by having the "updoped" third annular region extend at least to a radial point of about 30 microns. Consequently, the volume $V_3$ of the third annular region 3, is defined herein being calculated using $\Delta(3-2)dr/rdr$ between radius $r_2$ and r30 (the radius at 30 microns) and thus is defined as $$V_3 = 2\int_{r2}^{r30} \Delta_{(3-2)}(r)rdr$$

The volume $V_3$ of the outer cladding region (inside 30 microns) compared to that of the inner cladding region 2, is preferably greater than 5, more preferably greater than 7, and may be greater than 10% $\Delta\mu m^2$. This volume $V_3$ of the outer cladding region (inside 30 microns) is in some embodiments less than 80% $\Delta\mu m^2$.

In some embodiments, the refractive index $\Delta_3$ of the outer cladding region is greater than 0.01 percent, more preferably greater than 0.02 percent, when compared to that of the inner cladding region 2. In some embodiments, the third annular region comprises chlorine (Cl) in an amount greater than 1000 ppm, more preferably greater than 1500 ppm, and most preferably greater than 2000 ppm (0.2%) by weight.

The core region 1 preferably has a positive refractive index throughout. The core 1 comprises a maximum relative refractive index $\Delta_{MAX}$ occurring between r=0 and r=3 μm. $\Delta_{MAX}$ is preferably greater than 0.32-0.48%.

The inner cladding region 2 preferably has a substantially constant relative refractive index profile, i.e. the difference between the relative refractive index at any two radii within the intermediate region is less than 0.02%, and in some preferred embodiments less than 0.01%. Thus, the relative refractive index profile of the inner cladding region 20 preferably has a substantially flat shape.

The core region 1 may be a step index core, and may comprise an alpha (α) shape. In preferred embodiments, $R_1$ is less than 8.0 μm, preferably less than 6.0 μm. $R_1$ is preferably between 3.50 μm and 5.6 μm. The fibers are capable of exhibiting a bend loss of less than 0.15 dB/turn when wound upon on a 20 mm radius mandrel for fibers with MAC numbers between 6.6 and 7.5. The optical fiber disclosed herein has a MAC number of not more than 7.3 and a zero dispersion wavelength of less than 1450 nm.

Various exemplary embodiments will be further clarified by the following examples. It will be apparent to those skilled in the art that various modifications and variations can be made without departing from the spirit or scope of the claims.

Table 1 below list characteristics of modeled illustrative examples 1-9 having a refractive index as shown in FIG. 1. In particular, set forth below for each example is the refractive index delta $\Delta_1$, alpha$_1$, and outer radius $R_1$ of the central core region 1, refractive index delta $\Delta_2$ and outer radius $R_2$ inner cladding region 2, refractive index delta $\Delta_3$ and volume $V_3$ of the outer cladding region 3, which is calculated between inner radius $R_2$ of outer cladding region 3 and a radial distance of 30 microns (and between the refractive index $\Delta_3$ and that of $\Delta_2$). Also set forth are theoretical cutoff wavelength in nm, mode field diameter at 1310 nm, effective area at 1310 nm, chromatic dispersion at 1310 nm, dispersion slope at 1310 nm, attenuation at 1310 nm, mode field diameter at 1550 nm, effective area at 1550 nm, chromatic dispersion at 1550 nm, dispersion slope at 1550 nm, attenuation at 1550 nm, and 1×10 mm diameter induced bend loss in dB per turn at 1550 nm. In Table 1, these properties are modeled.

TABLE 1

| Parameter | Profile 1 | Profile 2 | Profile 3 | Profile 4 | Profile 5 |
|---|---|---|---|---|---|
| $\Delta_1$ (%) | 0.39 | 0.39 | 0.39 | 0.39 | 0.39 |
| $\alpha_0$ | 20 | 20 | 20 | 20 | 20 |
| $R_1$ (μm) | 4.25 | 4.26 | 4.25 | 4.25 | 4.25 |
| $\Delta_2$ (%) | 0.00 | 0.00 | 0.00 | 0.00 | 0.00 |
| $R_2$ (μm) | 12.88 | 12.91 | 12.88 | 17 | 10.625 |
| $R_1/R_2$ | .33 | .33 | .33 | .25 | .4 |
| $\Delta_3$ (%) | 0.03 | 0.04 | 0.05 | 0.10 | 0.05 |
| Theoretical cutoff (μm) | 1.2068 | 1.1741 | 1.1383 | 0.9948 | 1.1421 |
| MFD @1310 nm (μm) | 8.6 | 8.6 | 8.6 | 8.6 | 8.6 |
| Aeff @ 1310 nm (μm$^2$) | 58.7 | 58.9 | 58.7 | 58.7 | 58.8 |
| Dispersion @ 1310 nm (ps/nm/km) | −0.0006 | 0.0321 | −0.0115 | 0.0103 | −0.0982 |
| Dispersion Slope @ 1310 nm (ps/nm$^2$/km) | 0.0854 | 0.0854 | 0.0853 | 0.0855 | 0.0848 |
| Attenuation @ 1310 nm (dB/km) | 0.342 | 0.342 | 0.342 | 0.342 | 0.342 |
| MFD @ 1550 nm (μm) | 9.7 | 9.7 | 9.7 | 9.7 | 9.8 |
| Aeff @ 1550 nm (μm$^2$) | 72.9 | 73.1 | 73.0 | 72.9 | 73.3 |
| Dispersion @ 1550 nm (ps/nm/km) | 16.4194 | 16.4340 | 16.3450 | 16.4557 | 16.0558 |
| Dispersion Slope @ 1550 nm (ps/nm$^2$/km) | 0.0563 | 0.0561 | 0.0558 | 0.0563 | 0.0546 |
| Attenuation @1550 nm (dB/km) | 0.194 | 0.194 | 0.194 | 0.194 | 0.194 |
| Bend loss at 1550 nm, dB/20 mm dia. turn | <0.2 | <0.2 | <0.2 | <0.1 | <0.2 |

| Parameter | Profile 6 | Profile 7 | Profile 8 | Profile 9 |
|---|---|---|---|---|
| $\Delta_1$ (%) | 0.4 | 0.37 | 0.36 | 0.43 |
| $\alpha_0$ | 20 | 20 | 20 | 20 |
| $R_1$ (μm) | 4.35 | 4.5 | 4.4 | 4.2 |
| $\Delta_2$ (%) | 0.00 | 0.00 | 0.00 | 0.00 |

TABLE 1-continued

| | | | | |
|---|---|---|---|---|
| $R_2$ (μm) | 8.6 | 8 | 13.3 | 12.72 |
| R1/R2 | .51 | .56 | .33 | .33 |
| $\Delta_3$ (%) | 0.05 | 0.05 | 0.05 | 0.05 |
| Theoretical cutoff (μm) | 1.1993 | 1.1881 | 1.1191 | 1.1965 |
| MFD @1310 nm (μm) | 8.6 | 9.0 | 8.9 | 8.3 |
| Aeff @ 1310 nm (μm²) | 59.5 | 64.3 | 63.4 | 55.1 |
| Dispersion @ 1310 nm (ps/nm/km) | 0.1476 | 0.1071 | 0.1837 | 0.2316 |
| Dispersion Slope @ 1310 nm (ps/nm²/km) | 0.0846 | 0.0845 | 0.0857 | 0.0855 |
| Attenuation @ 1310 nm (dB/km) | 0.342 | 0.340 | 0.340 | 0.343 |
| MFD @ 1550 nm (μm) | 9.8 | 10.2 | 10.1 | 9.3 |
| Aeff @ 1550 nm (μm²) | 73.6 | 80.3 | 78.9 | 67.6 |
| Dispersion @ 1550 nm (ps/nm/km) | 16.2389 | 16.2213 | 16.6471 | 16.6101 |
| Dispersion Slope @ 1550 nm (ps/nm²/km) | 0.0544 | 0.0548 | 0.0562 | 0.0559 |
| Attenuation @1550 nm (dB/km) | 0.195 | 0.193 | 0.193 | 0.196 |
| Bend loss at 1550 nm, dB/20 mm dia. turn | <0.2 | <0.2 | <0.2 | <0.2 |

Table 2 below list characteristics of actual manufactured illustrative examples 10-15 having a refractive index as shown in FIG. 1. In particular, set forth below for each example is the refractive index delta $\Delta_1$, and outer radius $R_1$ of the central core region 1, refractive index delta $\Delta_2$ and outer radius $R_2$ inner cladding region 2, refractive index delta $\Delta_3$ and volume $V_3$ of the outer cladding region 3, which is calculated between inner radius $R_2$ of outer cladding region 3 and a radial distance of 30 microns (and between the refractive index $\Delta_3$ and that of $\Delta_2$). Also set forth are theoretical cutoff wavelength in nm, mode field diameter at 1310 nm, effective area at 1310 nm, chromatic dispersion at 1310 nm, dispersion slope at 1310 nm, attenuation at 1310 nm, mode field diameter at 1550 nm, effective area at 1550 nm, chromatic dispersion at 1550 nm, dispersion slope at 1550 nm, attenuation at 1550 nm, and 1×10 mm diameter induced bend loss in dB per turn at 1550 nm. In Table 2, these properties are measured on actual optical fibers.

| | Profile 10 | Profile 11 | Profile 12 | Profile 13 | Profile 14 | Profile 15 |
|---|---|---|---|---|---|---|
| Δ1 (%) | 0.42 | 0.41 | 0.40 | 0.46 | 0.41 | 0.46 |
| R1 (microns) | 4.6 | 5.4 | 4.9 | 5.1 | 4.7 | 4.9 |
| Dopant in region 1 | GeO2 | GeO2 | GeO2, F | GeO2 | GeO2 | GeO2 |
| Δ2 (%) | 0.00 | 0.00 | −0.04 | 0.00 | 0.00 | 0.00 |
| R2 (microns) | 14.8 | 10.0 | 10.2 | 10.2 | 11.1 | 13.6 |
| R1/R2 | 0.31 | 0.54 | 0.48 | 0.50 | 0.42 | 0.36 |
| Dopant in region 2 | none | none | F | none | none | none |
| Δ3 (%) | 0.06 | 0.05 | 0.00 | 0.06 | 0.03 | 0.04 |
| R3 (microns) | 62.5 | 62.5 | 62.5 | 62.5 | 62.5 | 62.5 |
| Dopant/updopant in region 3 | Cl | Cl | none | Cl | Cl | Cl |
| updopant concentration in region 3 (weight %) | 0.6 | 0.5 | na | 0.6 | 0.3 | 0.3 |
| updope volume V3 from R2 to 30 microns, (% delta · microns^2) | 41 | 40 | 32 | 48 | 23 | 29 |
| Attenuation at 1550 nm (dB/Km) | 0.186 | 0.194 | 0.227 | 0.187 | 0.192 | 0.201 |
| 22 m cutoff (nm) | 1210 | 1260 | 1175 | 1258 | 1192 | 1224 |
| MFD at 1310 nm (microns) | 8.77 | 8.84 | 8.55 | 8.40 | 8.46 | 8.48 |
| MAC (1310 MFD/22 m cutroff) | 7.2 | 7.0 | 7.3 | 6.7 | 7.1 | 6.9 |
| Lambda zero, nm | 1316 | 1302 | 1309 | 1299 | 1313 | 1307 |
| Dispersion Slope at 1310 nm (ps/nm^2/km) | 0.084 | 0.087 | 0.085 | 0.091 | 0.085 | 0.086 |
| Bend loss, 15 mm diameter mandrel, dB/turn | 1.065 | 0.185 | 2.781 | 0.151 | 0.848 | 0.52 |
| Bend loss, 20 mm diameter mandrel, dB/turn | 0.119 | 0.052 | 0.168 | 0.026 | 0.247 | 0.06 |
| Bend loss, 30 mm diameter mandrel, dB/turn | 0.007 | 0.000 | 0.004 | 0.001 | 0.005 | na |

As can be seen in both of Tables 1 and 2 above, the examples herein illustrate exemplary fibers which employ a central glass core region having index $\Delta_1$, a first inner cladding region having index $\Delta_2$, and an outer cladding region having index $\Delta_3$; wherein $\Delta_1 > \Delta_3 > \Delta_2$, wherein the difference between $\Delta_3$ and $\Delta_2$ is greater than or equal to 0.01 and a absolute value of profile volume, $|V_3|$ is at least 5% μm². These fibers exhibit a cable cutoff less than or equal to 1260 nm and a bend loss of less than 0.75 dB/turn when wound upon on a 20 mm diameter mandrel. These fibers also exhibit a mode field diameter between about 8.2 and 9.5 microns at 1310 nm, a zero dispersion wavelength between 1300 and 1324 nm, a dispersion slope at 1310 nm which is less than 0.09 ps/nm²/km). Many of these fibers also exhibit a bend loss at 1550 nm, when wound upon on a 15 mm diameter mandrel, of less than 1 dB/turn, and in some cases less than 0.5 dB/turn. These fibers also exhibit a bend loss at 1550 nm, when wound upon on a 20 mm diameter mandrel, of less than 0.75 dB/turn, more preferably less than 0.3 dB/turn, and some fibers most preferably less than 0.1 dB/turn. These fibers also exhibit a bend loss at 1550 nm, when wound upon on a 30 mm diameter mandrel, of less than 0.025 dB/turn, and some fibers more preferably less than 0.003 dB/turn. Some of these examples employ chlorine in the outer cladding region in an amount greater than 2000 ppm, and in some cases greater than 3000 or even greater than 4000 ppm by weight.

Attenuation (spectral) at 1550 nm is preferably less than 0.21 dB/km, more preferably less than 0.20 dB/km, even more preferably less than 0.197 dB/km.

Thus, the optical fibers described herein provide outstanding bending performance, and additionally provide cutoff wavelengths suitable for single mode operation at wavelengths greater than about 1260 nm.

In some embodiments, the core may comprise a relative refractive index profile having a so-called centerline dip which may occur as a result of one or more optical fiber manufacturing techniques. However, the centerline dip in any of the refractive index profiles disclosed herein is optional.

The optical fiber disclosed herein comprises a core and a cladding layer (or cladding or outermost annular cladding region) surrounding and directly adjacent the core. Preferably, the core is comprised of silica doped with germanium, i.e. germania doped silica. Dopants other than germanium, singly or in combination, may be employed within the core, and particularly at or near the centerline, of the optical fiber disclosed herein to obtain the desired refractive index and density. In preferred embodiments, the core of the optical fiber disclosed herein has a non-negative refractive index profile, more preferably a positive refractive index profile, wherein the core is surrounded by and directly adjacent to a cladding layer.

Preferably, the optical fiber disclosed herein has a silica-based core and cladding. In preferred embodiments, the cladding has an outer diameter, 2*Rmax, of about 125 μm.

The optical fiber disclosed herein may be surrounded by a protective coating, e.g. a primary coating P contacting and surrounding the outer cladding region 3, the primary coating P having a Young's modulus of less than 1.0 MPa, preferably less than 0.9 MPa, and in preferred embodiments not more than 0.8 MPa, and further comprises a secondary coating S contacting and surrounding the primary coating P, the secondary coating S having a Young's modulus of greater than 1200 MPa, and in preferred embodiments greater than 1400 MPa.

As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 μm) and 0.004" (102 μm) in thickness and about 1.3 cm in width, with a gauge length of 5.1 cm, and a test speed of 2.5 cm/min.

Additional description of suitable primary and secondary coatings can be found in PCT Publication WO2005/010589 which is incorporated herein by reference in its entirety.

Preferably, the optical fibers disclosed herein have a low OH content, and preferably have an attenuation curve which exhibits a relatively low, or no, water peak in a particular wavelength region, especially in the E-band. Methods of producing low water peak optical fiber can be found in PCT Application Publication Numbers WO00/64825, WO01/47822, and WO02/051761, the contents of each being hereby incorporated by reference. The optical fiber disclosed herein preferably has an optical attenuation (spectral) at 1383 nm which is not more than 0.10 dB/km above an optical attenuation at 1310 nm, and more preferably not more than the optical attenuation at 1310 nm. The optical fiber disclosed herein preferably has a maximum hydrogen induced attenuation change of less than 0.03 dB/km at 1383 nm after being subjected to a hydrogen atmosphere, for example 0.01 atm partial pressure hydrogen for at least 144 hours.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm.

The fibers disclosed herein exhibit low PMD values particularly when fabricated with OVD processes. Spinning of the optical fiber may also lower PMD values for the fiber disclosed herein.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. An optical fiber comprising:
    a germania doped central core region having outer radius $r_1$ and refractive index $\Delta_1$
    a cladding region comprising a first inner cladding region having an outer radius $r_2 > 8$ microns and refractive index $\Delta_2$ and a second outer cladding region surrounding the inner cladding region and comprising refractive index $\Delta_3$, wherein $\Delta_1 > \Delta_3 > \Delta_2$, and wherein the difference between $\Delta_3$ and $\Delta_2$ is greater than 0.01, said fiber exhibits a 22 m cable cutoff less than or equal to 1260 nm, and $r_1/r_2$ is greater or equal to 0.25.

2. The optical fiber of claim 1, wherein the first inner cladding region contains less than 0.02 wt % fluorine.

3. The optical fiber of claim 1, wherein the first inner cladding region is essentially free of fluorine and germania.

4. The optical fiber of claim 1, wherein $\Delta_3 > \Delta_2$ for a length extending from $r_2$ to a radius of at least 30 microns.

5. The optical fiber of claim 1, wherein $r_1/r_2$ is greater than 0.3.

6. The optical fiber of claim 1, wherein the profile volume, $V_3$ of the outer cladding region, calculated between the outer radius of the first inner cladding region and a radial distance of 30 um, is equal to:

$$V_3 = 2\int_{r2}^{r30} \Delta_{(3-2)}(r)rdr$$

and $|V_3|$ is at least 5% $\Delta\mu m^2$.

7. The optical fiber of claim 1, wherein said fiber exhibits a bend loss of less than 0.75 dB/turn when wound upon on a 20 mm radius mandrel and exhibits a MAC number between 6.6 and 7.5.

8. The optical fiber of claim 1, wherein the width of first inner cladding region $r_2$-$r_1$ is between 3 and 13 microns.

9. The optical fiber of claim 7, wherein said fiber exhibits a bend loss of less than 1 dB/turn when wound upon on a 15 mm radius mandrel.

10. A single mode optical fiber comprising
 a central core region having outer radius $r_1$ and refractive index $\Delta_1$
 a cladding region comprising fluorine doped silica, said cladding comprising a first inner cladding region having outer radius $r_2$ and refractive index $\Delta_2$ and a second outer cladding region having refractive index $\Delta_3$, wherein $r_1/r_2$ is greater than 0.25.

11. The fiber of claim 10, wherein said core contains less than 2 wt percent Germania.

12. The fiber of claim 10, said core is essentially free of germania.

13. The fiber of claim 10, wherein said fiber exhibits a 22 m cable cutoff less than or equal to 1260 nm.

14. The optical fiber of claim 10, wherein the profile volume, $V_3$ of the outer cladding region, calculated between the outer radius of the first inner cladding region and a radial distance of 30 um, is equal to:

$$V_3 = 2\int_{r2}^{r30} \Delta_{(3-2)}(r)rdr$$

and $|V_3|$ is at least 5% $\Delta\mu m^2$.

15. The optical fiber of claim 10, wherein said fiber exhibits a bend loss of less than 0.75 dB/turn when wound upon on a 20 mm radius mandrel and exhibits a MAC number between 6.6 and 7.5.

16. The optical fiber of claim 10, wherein the width of first inner cladding region $r_2$-$r_1$ is between 3 and 13 microns.

17. The optical fiber of claim 15, wherein said fiber exhibits a bend loss of less than 1 dB/turn when wound upon on a 15 mm radius mandrel.

* * * * *